March 16, 1971     C. E. KRAUS     3,570,317
TRACTION DRIVE APPARATUS AND CONTROL SYSTEM
Filed Jan. 8, 1969     3 Sheets-Sheet 1

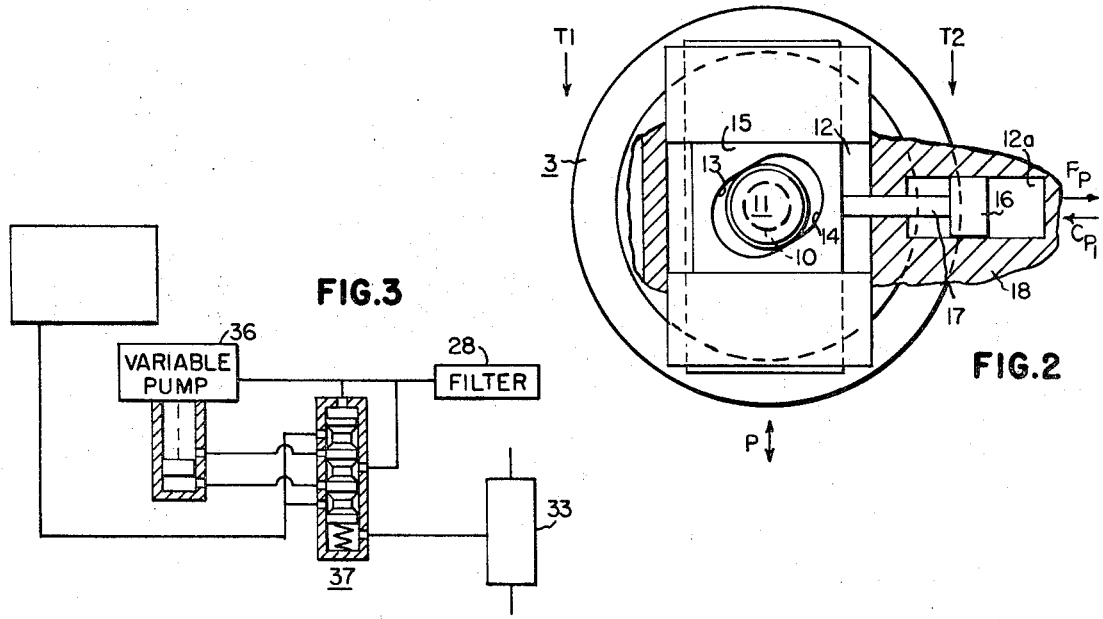
FIG.3
FIG.2
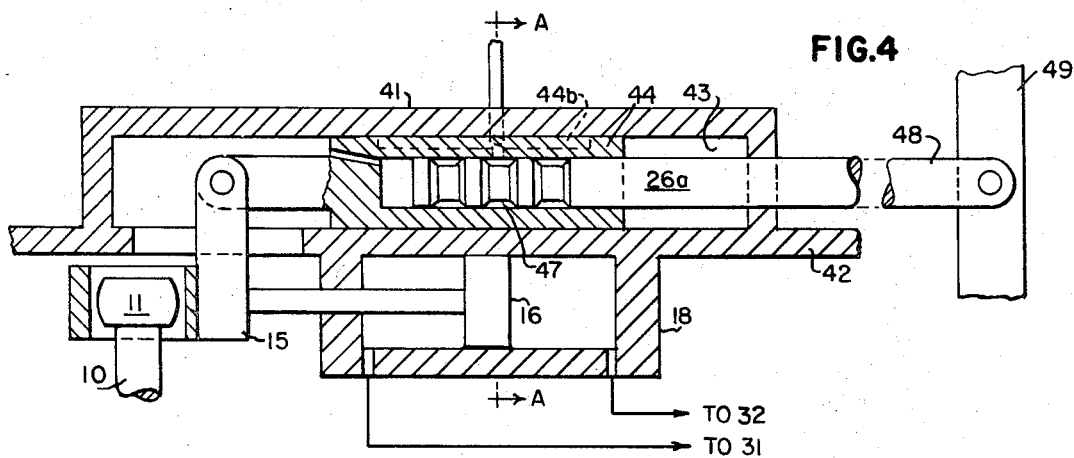
FIG.4
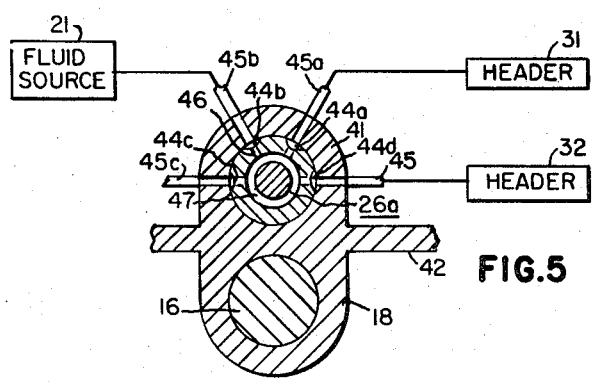
FIG.5

March 16, 1971 C. E. KRAUS 3,570,317
TRACTION DRIVE APPARATUS AND CONTROL SYSTEM
Filed Jan. 8, 1969 3 Sheets-Sheet 3

United States Patent Office 3,570,317
Patented Mar. 16, 1971

3,570,317
TRACTION DRIVE APPARATUS AND CONTROL SYSTEM
Charles E. Kraus, Allendale, N.J., assignor to Excelermatic, Inc.
Filed Jan. 8, 1969, Ser. No. 789,803
Int. Cl. F16h *15/20*
U.S. Cl. 74—200
27 Claims

ABSTRACT OF THE DISCLOSURE

Traction drive apparatus having driving and driven elements such as opposing toric faces and one or more rollers for transferring motion between them and a control assembly for each roller. Illustrated embodiment includes a cam follower on pivot support for roller and cam surface; a piston connected to the cam face is subject to pressure on opposite faces for enabling ratio adjustment for load equalization or speed change. Fluid control means for regulating operation of the apparatus are provided.

BACKGROUND OF THE INVENTION

This invention relates to transmissions of the traction drive type and especially to such transmissions of the type comprising a pair of drive members having facing toroidal surfaces with rollers disposed between and in friction driving contact with the surfaces and with each of the rollers being mounted for pivotal movement or precession of its axis of rotation to change the speed ratio of the driving connection between the members. Such toroidal transmissions are disclosed in numerous patents of applicant such, for example, as U.S. Pat. No. 2,850,910, U.S. Pat. No. 2,850,911 and U.S. Pat. No. 3,008,337.

BRIEF DESCRIPTION OF THE DRAWINGS

FIG. 2 illustrates, partly in section, details of the control assembly of FIG. 1;

FIGS. 3–5 and 7 disclose, schematically in part, particular features of apparatus having utility in my invention.

DESCRIPTION

Figure 1:
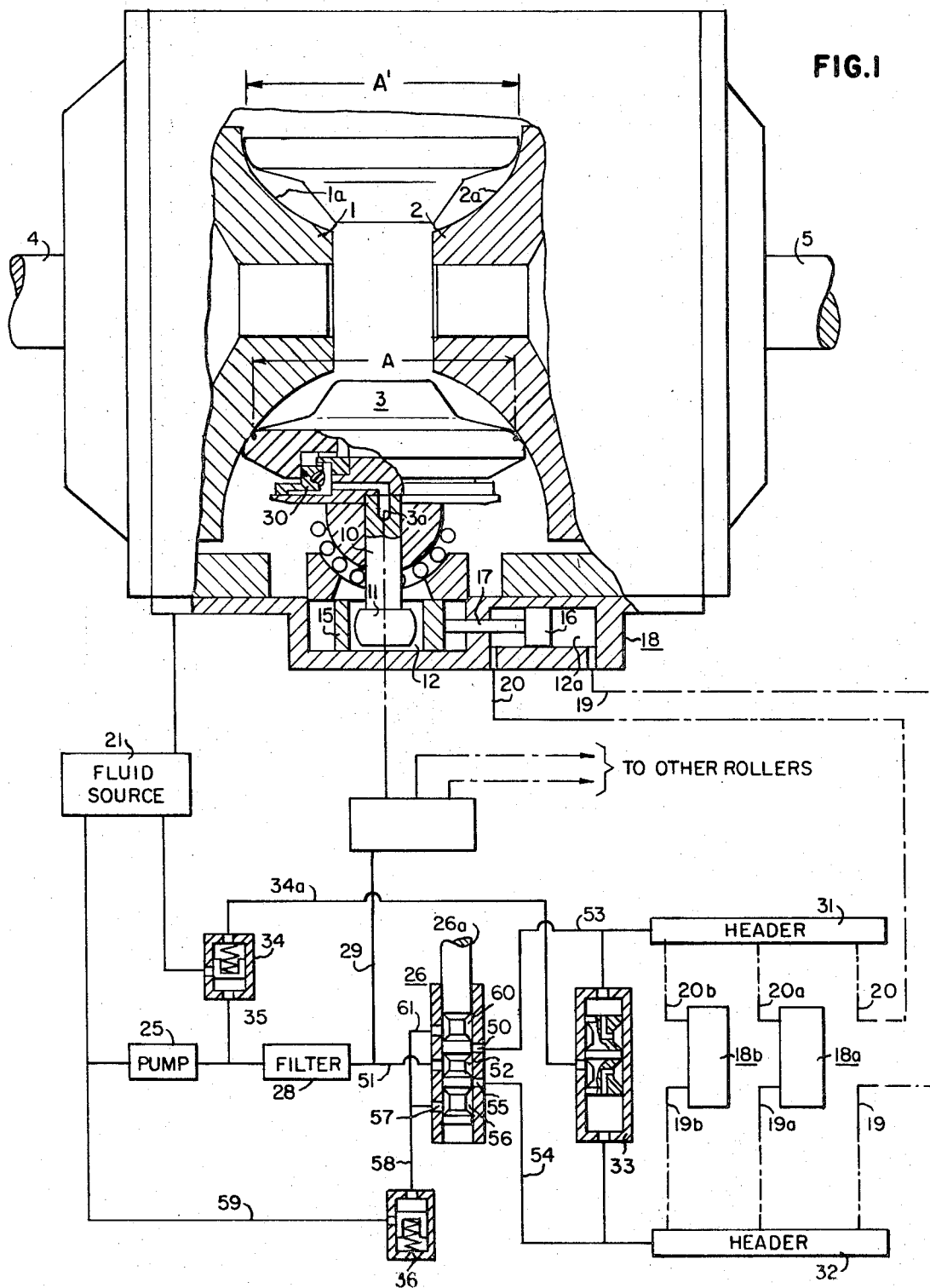
FIG. 1 discloses traction drive apparatus including control apparatus embodying my invention.

Referring to FIG. 1, there are illustrated essential features of a toroidal drive including a driving member 1 and a driven member 2 having facing toroidal surfaces 1a and 2a with rollers 3 disposed between them for transmitting motion between the members. Input or driving shaft 4 drives member or disc 1 and member or disc 2 is connected to transmit output power to output or driven shaft 5.

There is illustrated only one roller 3, but any suitable number may be employed; I customarily employ three such rollers equally spaced around the axis of the drive as shown in U.S. Pat. No. 3,008,337. Each roller has its own independent control and there is no mechanical connection between them. As best seen in FIGS. 1 and 2, each roller 3 is carried or supported by a roller shaft 10 having a cam follower or roller 11 on the opposite end disposed within chamber 12 of control cylinder 18 in the housing of the drive. Each roller is pivotally supported for motion about pivot axis 3a such that the center line of shaft 10 is normal to and intersects axis 3a.

Cam roller 11 is disposed for engagement with inclined cam faces 13 and 14 of precess control cam 15 within chamber 12. The control cam is connected to a piston 16 disposed in chamber 12a by connecting rod 17, thereby causing cam 15 and piston 16 to reciprocate together within their respective chambers of control cylinder 18. Each cylinder is positioned crosswise, i.e., transversely, of pivot axis 3a and is supplied pressurized fluid, such as a suitable lubricating oil, from a suitable source 21 through conduits 19 or 20 to either end of the cylinder. Thus, there is provided a movable (shown as reciprocable) member 16 having operative association or relationship with roller 3, whereby selective control of the pressurized fluid is caused to move piston 16 to effect the desired speed ratio.

Roller 3 is subjected to tangential forces T1 and T2, as shown in FIG. 2, approximately equal on each side, and applied at the contact areas parallel to the pivot axis 3a of the roller. The sum of forces T1 and T2 is applied to cam roller 11. The moment due to the distance between contact areas and cam roller displaces the reaction force supporting the pivot axis but has no effect on precess or control. The cam roller 11 pushes on an inclined surface in precess cam 15 and a vector of its force, $F_p$, is directed to control piston 16. In order to remain in a given position, the force $C_{p1}$ on the piston due to hydraulic pressure must exactly balance this component.

If one roller assembly is not in position to carry its exact share of the load, the component of the tangential forces against the control piston will be different, either greater or less, than the others and the fluid force will cause the piston to move and the inclined cam surface will cause the pivot shaft to move along its axis. This movement causes a precess or ratio change movement of the roller assembly and a change in the tangential forces. Such movement or movements continue until there is an exact balance between all roller assemblies. Axial movement along the pivot axis of only a few thousandths of an inch causes an almost instantaneous correction of ratio position.

The individual controls disclosed herein are force balanced independently of each other. Apparatus of the type described encounters variations which prevent all rollers from performing identically and which make impossible a rigid tie between all rollers and all attempts to control identically all rollers have failed. Traction rollers of the type shown have slightly different periods of vibration due to slight differences in physical characteristics, including differences of dimensions among the motion transmitting means or rollers as well as the driving and driven members or discs resulting from unbalances, slight departures from identity such as manufacturing tolerances, load deflections, load variations, uneven wear, etc., and differences in homogeneity, density and hardness of materials. Each roller must carry its share of the load regardless of angle, manufacturing inaccuracies, housing or toric elements, or any other part due to load or temperature.

It has been discovered that the rollers continually make small departures (or "dance") from mean positions. No roller operates at precisely the same speed ratio as the others, if freedom to adjust is provided, and every roller under such conditions tends to depart from or dance with respect to whatever ratio position is assumed by that roller.

The key to a dependable drive of the type described under all conditions is to provide a connection between the roller and the control member, such as piston 16, of such a nature that each roller is permitted sufficient freedom of motion to permit such "dancing" due to various inequalities compared to other rollers *without* causing piston movement. In other words, it is desired to hold as fixed as possible the piston position but to permit adjusting movements of each roller to the conditions experienced from moment to moment. Thus each piston and hence the entire drive is force balanced by the average of the tangential forces but instantaneous differences are balanced by this "secondary" and individual adjustment of the rollers.

With older drives of the toric type, roller variations caused relocation of pistons, etc., which caused ratio changes of rollers, which on occasion further affected the piston, etc. In such drives, if the apparatus is rigid enough to hold the piston positions, then the rollers can't dance. Rubbing, scraping and undesirable oscillations result.

In this case, the necessary flexibility is provided by the cam and cam follower arrangement wherein the cam roller 11 has limited movement within the cam slot without affecting movement of piston 16.

As previously mentioned, three rollers are usually used. Accordingly, three control assemblies are also provided comprising control cylinders 18, 18a and 18b. As described later in detail, these cylinders are connected to the source of fluid by means including conduits 19, 19a, 19b, 20, 20a, and 20b.

Since all rotating equipments have natural periods of vibration due to small unbalances and the number of elements, load deflections, load variations, etc., it is desirable to provide damping means in order to prevent development of troublesome oscillations at critical combinations of speed and load fluctuations. This damping is effectively accomplished by making conduits 19, 19a and 19b of equal length, and conduits 20, 20a and 20b of equal length. These conduits are of sufficiently small internal cross-sectional area to provide a restricted flow rate. This arrangement restricts the rate of movement of the respective control pistons and damps all movements without any noticeable effect on normal rates of precess required for ratio adjustments.

While there is illustrated an embodiment of equal-length equal-cross-section conduits, the present invention is not limited to that embodiment. Different lengths and different cross-sections are permissible so long as the dimensions are such as will provide substantially the same hydraulic friction within each conduit. Further, restrictions to fluid flow including restricted openings and/or porous sections may provide the desired equality of resistance.

Because of manufacturing tolerances, the positions of the traction contacts are not the same on all rollers. As shown in extreme in FIG. 1, the diameter across the roller from one contact to the other can vary appreciably, as from A to A'. For a given ratio of drive the roller assemblies take the same angular position only at a 1:1 ratio. At all other ratios they have different angles, if diameters differ as measured this way. This is not related to the roller diameter measured from the contacts to the pivot axis, which is normally held within a few thousandths by shimming at assembly. It is obvious that the load balancing method of ratio control disregards the angular position of the roller assemblies. Each roller must carry its share of the load regardless of angle, manufacturing accuracies, or deflections of housing or any parts due to load or temperature.

A major advantage of the use of individual control cylinders positioned crosswise of the pivot axis is the appreciable movement of the control piston required to cover the ratio range, the maximum ratio being determined by the length of cylinder bore or chamber 12a. Each position corresponds to a given ratio and fluid flow into or out of the cylinder is required to change a ratio position. In previous hydraulic control systems, such as shown in U.S. Pat. No. 3,008,337, the control cylinder was in line with the pivot axis and furnished a precess motion with very little movement. These pistons could not be damped and additional damping means was required. If such means failed, the roller assemblies could swing out of position without physical restriction. With the cross mounted control cylinders, the roller assemblies cannot move out of position relative to each other without piston movement.

Extremely stable ratio position under the most adverse operating conditions and exact load division between rollers assemblies is now attainable without interfering with fast normal ratio adjustment and with part variations, unbalanced conditions and deflections normally encountered in such drives.

A general arrangement for one type of hydraulic circuitry for a drive having individual control cylinder and precess cams is shown in FIG. 1. This arrangement is used primarily where one of the shafts, usually the output, must be maintained at a predetermined speed. This embodiment uses a fixed volume pump 25 and a governor controlled servo valve 26 for maintaining a constant output speed as needed, for example, in a constant speed drive for aircraft alternators. The pump 25 draws fluid from the source of supply or tank 21, which may be an integral part of the drive apparatus, and pumps it through a filter 28 to the feeder lines 29 to the bearings 30 of the drive (preferably of the hydrostatic type, such as shown in FIG. 1 and described and claim in my copending application Ser. No. 871,458 filed Sept. 9, 1969 as a continuation-in-part of my application Ser. No. 707,911, filed Feb. 5, 1968, now abandoned) and to the servo valve 26 for speed control. This valve directs the fluid to one or the other of the supply headers 31 and 32 depending on the position of arm 26a, which headers may be, for example, conduit or tubing of substantially larger diameter than used for conduits such as 19. From there, fluid goes to the control cylinders 18, 18a and 18b through approximately equal lengths of small diameter tubing 19, 19a, 19b and 20, 20a and 20b respectively.

If the precess or ratio change is in such direction as to require movement of piston 16 to the right as viewed in FIG. 1, servo valve 26 is moved upwardly sufficiently to uncover opening 50 to permit fluid from pipe or conduit 51 to flow through chamber 52, opening 50 and conduit 53 to header 31 and conduit 20. Fluid in the space to the right of piston 16 returns through conduit 19 to header 32 and returns to pump 25 by way of conduit 54, opening 55, chamber 56, opening 57, conduit 58, back pressure relief valve 36 and conduit 59.

If movement of piston 16 is required toward the left of FIG. 1, arm 26a is moved downwardly in any effective manner to connect conduits 51 and 54 by way of opening 55 to direct fluid into header 32. Return fluid passes through header 31, conduit 53, opening 50, space 60 and conduit 61.

The headers may also be connected to opposite sides of relief control valve 33 whose spool shifts to direct the fluid under the highest pressure back to the pump bypass relief valve 34 by way of conduit 34a. The spring setting in valve 34 is relatively low but the pump must produce through conduit 35 a pressure equal to or greater than the sum of the valve spring requirement and the control pressure required so there is always adequate pressure available over the control needs. Alternatively, valve 33 can be omitted and conduit 34a can be directed to the bearings as a source of fluid.

Since there are times, because of acceleration or overload, that pressure is needed which is several times that required for normal operation, considerable power can be saved by biasing the pump bypass relief valve 34 and making the system pressure proportional to needs.

Savings in power and efficiency can be made if an adjustable volume pump is used, also controlled so that system pressure is proportional to need. In FIG. 3, there is shown an embodiment wherein an adjustable or variable pump 36 replaces fixed volume pump 25 of FIG. 1. The bypass relief valve 34 of FIG. 1 now becomes a four-way valve 37 controlling the pump volume regulating cylinder associated therewith (not shown) and no fluid is bypassed back to the tank. This arrangement is slightly heavier and more expensive but may be warrented where heat dump is a critical problem.

Most applications require a control that will allow the selection of any speed and often a more or less continually changing speed. The latter is patricularly required when the drive is used as a vehicle transmission or as a hoist drive. FIG. 4 shows a servo- valve spool 26a mounted within servo-valve body 41 attached to the precess cam body housing 42 and may be employed with the apparatus of FIG. 1. The valve body 44 is arranged to slide in a chamber 43 within body 41.

Referring to FIG. 5, which is a cross-sectional view of FIG. 4 taken along the line A—A of FIG. 4, the body also has a plurality of circumferentially spaced, longitudinally extending grooves 44d, 44a, 44b and 44c. Conduits 45 and 45a communicate between grooves 44d and 44a and headers 31 and 32. Conduit 45b conducts fluid from fluid source 21 by way of control pump 25 to groove 44b; conduit 46 conducts incoming fluid from groove 44b into space 47 in spool 26a which operates in the same manner described in connection with FIG. 1. Conduit 45c conducts fluid away from the assembly. Since there is a position of the precess cam 15 corresponding to every ratio position, it follows that the same is true of the valve body 44 and, therefore, since this is a servo-valve, the ratio control shaft 48 will change the ratio up or down by its movements in or out under control of adjustable arm 49. There is, of course, only one such servo-valve connected to only one precess cam. However, the precess cam movement is adequately damped by the small diameter feed lines and the drive stability is not affected.

Figure 6:
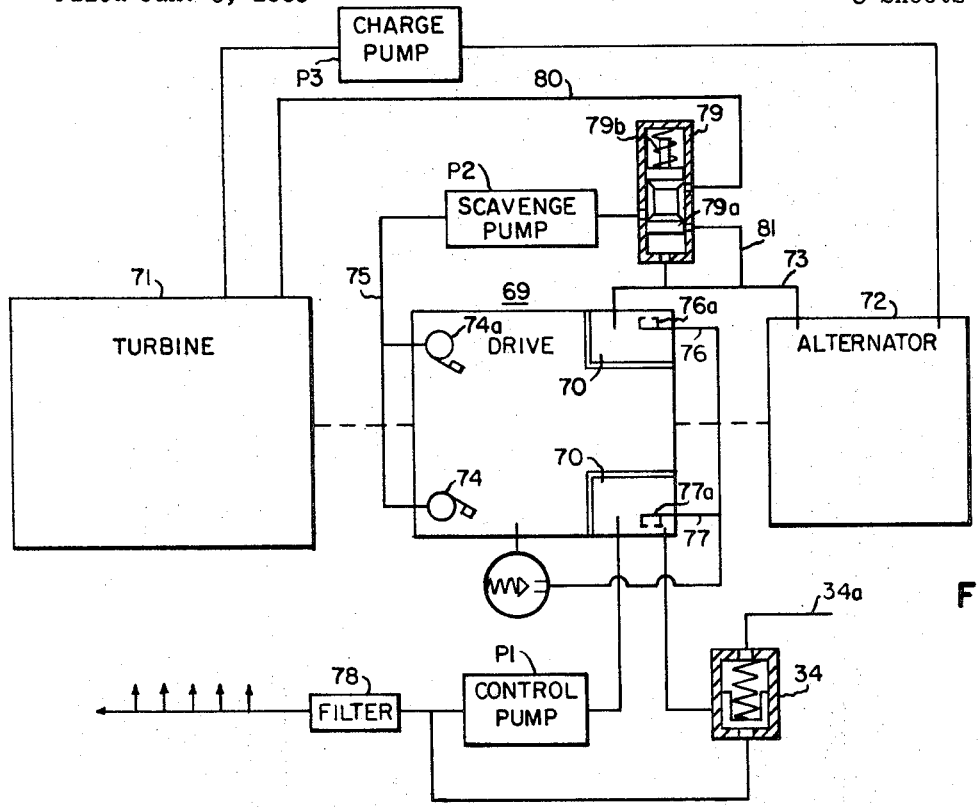
FIG. 6 shows a special application of my invention.

The required errangement can be somewhat more complicated for special conditions. FIG. 6 shows schematically a three pump arrangement for applications where the drive and control system are subject to variable conditions. For example, fighter aircraft must be operable in every conceivable position, including upside down. Such aircraft employ jet engines where the turbine engine oil is freqeuntly dirty and includes entrapped air. The supply may be interrupted when the plane acrobats. The drive also is rotated in all directions. Such systems include alternators as power sources. If a turbine driven traction drive as illustrated herein is used to drive the alternator, a constant supply of clean pressurized fluid is required for both bearings and control cylinders.

As shown, the drive 69 of FIG. 6 is provided with a small capacity, generally annular charge tank or chamber 70, which, in normal operation, receives fluid from turbine 71 through cooling conduits (not shown) in alternator 72 and conduit 73. In order to provide suitable pressurized fluid for drive bearings and any associated servos, there is provided control pump P1 which serves to pull fluid from the charge tank and deliver it, after passage through filter 78, to the above-mentioned parts. Pump P1 is connected to charge tank 70 so that the intake is below the fluid level and air is not drawn into the pump.

Means is provided for returning fluid accumulating in drive 69 to turbine 71 and for preventing an undesirable accumulation of fluid in the drive. There is provided a plurality of annularly-spaced weight-controlled valves, represented by valve 74, in open position, and valve 74a, in closed position. Only the valve nearest earth is open. Fluid from the open valve is drawn through conduit 75 by scavenge pump P2 and forced through recirculating valve 79 and conduit 80 to turbine 71. Spool 79a is biased as by spring 79b, to permit fluid to pass under normal conditions.

Means is provided for recirculating fluid in the drive 69 if, for any reason, incoming fluid from turbine 71 is interrupted. As soon as the pressure on the output side of pump P2 and in the charge tank 70 drops sufficiently, spring 79b effects movement of spool 79a to close off conduit 80 and open conduit 81 which joins conduit 73 and completes the recirculating path.

In order to clear the charge tank of air entrapped in the incoming fluid, there is provided a plurality of conduits, such as 76, 77 having suitable orifices 76a, 77a located at the periphery of charge tank 70. The number of orifices, of course, is sufficient to maintain at least one orifice above fluid level at all times.

Figure 7:
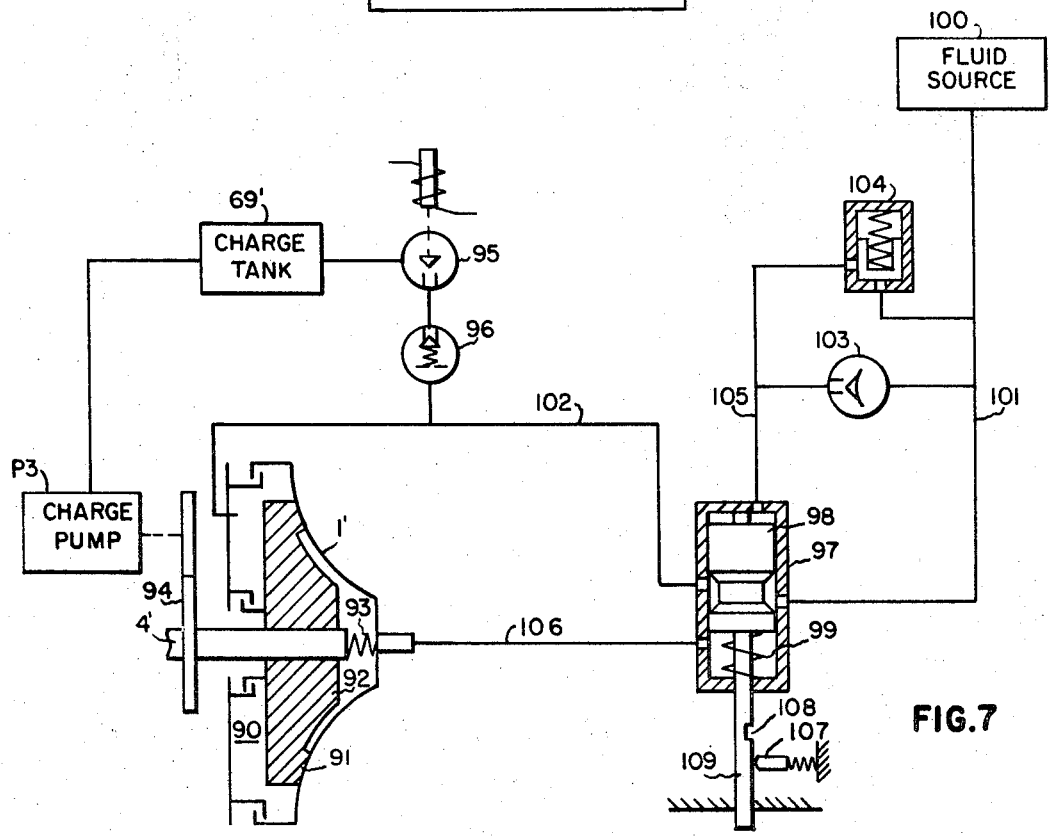

Aircraft suffer damage from anti-aircraft missiles, oil lines break, alternators throw coils, and other emergencies make it desirable to disconnect the drive from the turbine engine before damage is done to the engine. Although they are usually driven through a shear shaft which would shear on a sudden extreme rise in torque, provision is preferably also made for disconnection for overheating. It is advantageous to disconnect without destroying a shaft, as maintenance time is less and it may also be advantageous to try to reconnect in the air under some conditions. FIG. 7 shows schematically an arrangement where the driving member such as the input traction disc 1' is driven from shaft 4' through an engaging means such as a clutch facing 91 carried by plate 92. With no pressure at bearing 90, which is preferably of the hydrostatic type, a spring 93 normally biases apart or prevents engagement between the engaging means or clutch face 91 and member 1' and the drive will not operate. In order to start up, the charge pump P3 which is driven by the input shaft 4' (as by suitable gearing 94, for example) raises the pressure in the charge tank 69' and this pressure causes fluid flow through a solenoid valve 95, and a check valve 96 to the bearing 90. With no control pressure, the drive is at full reduction and, in fact, disconnected. Under such conditions, a small torque will effect rotation of the plate 92 and the pump pressure builds up until it forces clutch 91 into engagement with disc 1' against the bias of spring 93.

There may be predetermined conditions, such as overload or excessive temperature, for example, making desirable means for removing or preventing the driving connection between input and output shafts. In FIG. 7, as described above, there is disclosed a clutch arrangement between the input shaft and the driving disc or member. Fluid under pressure is used for engaging the clutch drive in opposition to a bias. Means is provided for decoupling the clutch or engaging means by withholding the fluid pressure and, hence, releasing clutch pressure. Means is also provided for forceably disconnecting the clutch in addition to releasing the engagement pressure and means is provided for initiating the decoupling action when specified conditions are present. FIG. 7 shows a solenoid valve 95 in the clutch initiating circuit. This is energized in any suitable manner as by a timer (not shown) to delay clutching when starting a cold or a very hot engine until the engine is brought up to minimum idle speed. It could also be used to attempt restarts in the air after overheat disconnect if a timer should be employed to kick it off after a time short enough to prevent burning the clutch facing if the drive was jammed. Pressure from a suitable control pump 25 of FIG. 1 or pump P1 of FIG. 6 is directed to input bearing 90 by a decoupler valve 97, shown in normal position. The spool 98 is held in the upper position by a spring 99. In this position, fluid reaches bearing 90 by way of conduits 101 and 102. In addition, control pressure is applied to a thermostatic valve 103 and an excess pressure relief valve 104. Either overheating or overloading will cause operation of the appropriate valve so that pressure is applied to the upper end of the spool 98 by way of conduit 105, which causes the spool to move to cut off pressure in conduit 102 to the input bearing. It can also apply pressure between plate 92 and input disc 1' by way of conduit 106 and effectively "blows off" the clutch. Solenoid valve 95 must be reenergized by any suitable means for a restart.

Means may be provided for preventing return of decoupling valve 97 to normal operating position upon removal of the predetermined condition. In such a case there may be provided a biased detent 107 arranged for engagement with a recess 108 on arm 109 of the valve body or spool 97. Suitable means, not shown will be provided to enable withdrawal of the detent. There may be provided means for observing operation of the decoupling valve from outside the drive so that inspection will disclose decoupling has occurred. In FIG. 7, there is shown an arrangement whereby arm 109 extends through an opening in the housing of the drive.

What I claim is:

1. Traction drive apparatus of the type comprising a driving member, a driven member, a plurality of rotatable means for transmitting motion between said members, and means for changing the speed ratio of said members; the improvement comprising a control assembly for each of said motion transmitting means including a movable member having operative relationship with the associated motion transmitting means and movable responsive to variations of tangential forces on the associated motion transmitting means in order to adjust to inequalities of operation; a source of fluid under pressure; and means utilizing said fluid for causing said movable members to effect movement of said transmitting means to the desired ratio positions; each said control assembly also comprising means connecting said motion transmitting means to said movable member in such manner as to permit relative movement of said motion transmitting means with respect to the associated movable member without altering the ratio-determining position of said associated movable member whereby inequalities due to slight differences in physical and dynamic characteristics among motion transmitting means and of said driving and driven members do not effect a ratio-changing movement of said movable member.

2. The apparatus of claim 1 wherein said motion transmitting means comprises a roller rotatable about an axis.

3. The apparatus of claim 1 wherein the control assembly comprises a precess control cam and a cam follower associated with said motion transmitting means engaging said cam and means for conveying movement of said movable member to said motion transmitting means through said cam and said cam follower and vice versa.

4. The apparatus of claim 3 and means for applying pressure on said movable member for causing movement thereof in a direction determined by the amount and disaid cam, and means for conveying movement of said rection of pressure on said movable member in order to effect load division between said motion transmitting means.

5. The apparatus of claim 4 wherein the motion transmitting means is a roller and there is provided means for pivotally supporting said roller for motion about a pivot axis for selecting a desired speed ratio between said members or permitting precession of said roller; wherein said control assembly comprises a chamber extending laterally of said axis; said roller supporting means comprises a shaft connected to said roller, the center line thereof being normal to and intersecting said axis; said movable member comprises a piston disposed within said chamber; said cam follower being carried by said shaft for engagement with said cam member for translating pivotal movement of said follower and shaft to said piston by action of said cam follower against said cam member.

6. The apparatus of claim 5 provided with means for varying the pressures on opposite faces of said piston in order to cause said piston to move in the direction of greater pressure whereby said roller is caused to pivot through the interaction of said cam member and said cam follower.

7. The apparatus of claim 3 provided with a housing, wherein fluid may include entrapped air, and means for separating said air from said fluid.

8. The apparatus of claim 7 provided with means for removing fluid from the housing in order to prevent accumulation of an excessive amount of fluid in said housing.

9. The apparatus of claim 5 provided with means for effecting load division between said rollers comprising means for introducing fluid under pressure on opposite sides of each of said pistons for causing movement of said pistons in directions determined by the difference of pressures on said opposite sides.

10. The apparatus of claim 9 provided with means for damping ratio-adjustment movements of said rollers comprising said fluid introducing means in the form of an input conduit and an output conduit for each piston, the input conduits being so arranged that the same hydraulic friction is provided in each, and the output conduits being so arranged that the same hydraulic friction is provided in each, the degree of damping effected being dependent upon the amount of resistance to fluid flow provided in said conduits.

11. The apparatus of claim 10 wherein said input and output conduits are respectively of the same length and the same cross-sectional area whereby the degree of damping depends upon the cross-sectional area of said conduits.

12. The apparatus of claim 9 provided with means utilizing fluid pressure for selecting the speed ratio of said driving and driven members.

13. The apparatus of claim 10 provided with means responsive to a predetermined excessive temperature or excessive pressure of operation of said apparatus for controlling the flow of fluid to said fluid introducing means.

14. The apparatus of claim 13 provided with means for assuring adequate pressure in said control assembly.

15. The apparatus of claim 14 in which said fluid introducing means includes a pair of headers, said input conduits being connected to one header and said output conduits being connected to the other header and the pressure assuring means comprises means for diverting fluid from that header having the higher pressure to the output of said pump.

16. The apparatus of claim 14 in which the pressure assuring means comprises means connected between said headers including means responsive to the difference in pressure between said headers for connecting the header of higher pressure to the pump outlet.

17. The apparatus of claim 5 provided with speed responsive means for controlling the application of pressure to said movable member.

18. The apparatus of claim 5 wherein said control assembly comprises a housing, a pair of chambers in said housing, the piston being disposed in one of said chambers and said cam being disposed in the other of said chambers, means connecting the cam and the piston for reciprocation within their respective chambers, the shaft supporting the roller extending into said other chamber whereby the cam follower carried by said shaft engages the cam face of said cam, a source of pressurized fluid, a first conduit for connecting said source to one end of said one chamber and a second conduit for connecting said source to the other end of said one chamber, means for selectively introducing said fluid into said one chamber by way of said first or said second conduit for causing said piston to move in the selected direction and thereby move said cam, the associated cam follower and said shaft for changing the speed ratio.

19. The apparatus of claim 1 provided with means for pumping said fluid, first and second means for receiving fluid, first and second fluid carrying means communicating between respective fluid receiving means and said chamber on opposite sides of said movable member, means for directing fluid from said pumping means to one of said fluid receiving means and means for directing fluid from the other of said fluid receiving means to said pumping means.

20. The apparatus of claim 19 in which said motion transmitting means comprises a plurality of motion transmitting means each having an individual control assembly whereby there are a corresponding plurality of fluid carrying means, said first fluid carrying means being of the same length, said second fluid carrying means being of the same length and the cross-sectional areas of said fluid carrying means are sufficiently small in cross section to provide damping of said motion transmitting means.

21. The apparatus of claim 20 provided with means for assuring adequate pressure in said control assembly.

22. Traction drive apparatus according to claim 1 provided with a driving element disposed for operative engagement with said driving member, means utilizing said fluid for effecting said driving engagement, and means for withholding said fluid for effecting disengagement with said driving member.

23. Traction drive apparatus according to claim 1 provided with a driving element disposed for operative engagement with said driving member, means normally preventing engagement between said driving element and said driving member, a source of fluid under pressure, means utilizing said fluid for overcoming said preventing means and effecting said driving engagement and means utilizing said fluid for supplementing the operation of said separating means for effecting separation of said engaging means and said driving member.

24. Traction drive apparatus of the type comprising a housing enclosing a driving member, a driven member, work apparatus driven from said driven member, means for transmitting motion between said members, and fluid means including a source of fluid for controlling operation of the apparatus and wherein the fluid may include entrapped air; the improvement comprising a vertically-disposed generally annular chamber extending substantially along the inner periphery of said housing adapted to receive said fluid and entrapped air whereby said air is separated from said fluid.

25. Apparatus according to claim 24 in which said housing is provided with a plurality of gravity biased valves spaced normally in a vertical plane at intervals around the inside of said housing, a first pump for conducting fluid from said source to said chamber, a second pump for withdrawing fluid from said chamber and conducting said fluid into said housing, and means for returning fluid from said housing to said source, said means comprising at least one of said gravity biased valves.

26. The apparatus of claim 25 provided with means responsive to a predetermined condition resulting in cutting off said fluid source for maintaining fluid in said chamber and said housing.

27. The apparatus of claim 26 in which said maintaining means comprises a third pump effective upon loss of pressure at said fluid source to receive fluid from said returning means and conducting it to said chamber.

References Cited

UNITED STATES PATENTS

| | | | |
|---|---|---|---|
| 2,157,065 | 5/1939 | Madle | 74—190.5 |
| 3,008,337 | 11/1961 | Kraus | 74—200 |

MILTON KAUFMAN, Primary Examiner